Nov. 1, 1932.　　C. A. CAMPBELL　　1,885,894
DRAIN CUP FOR AIR BRAKES
Filed Oct. 17, 1930　　2 Sheets-Sheet 1
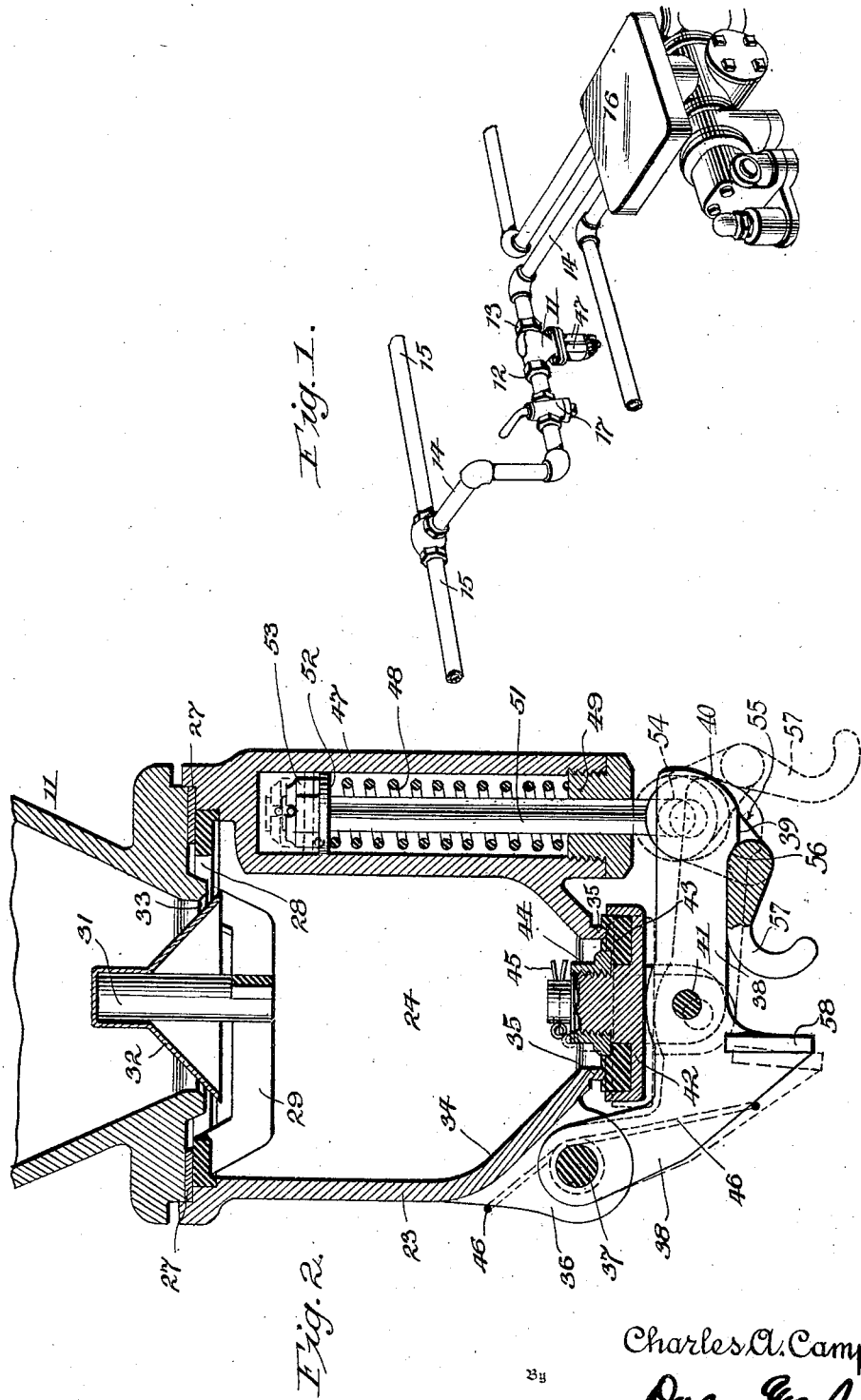
Inventor
Charles A. Campbell
By
Dodge
Attorneys

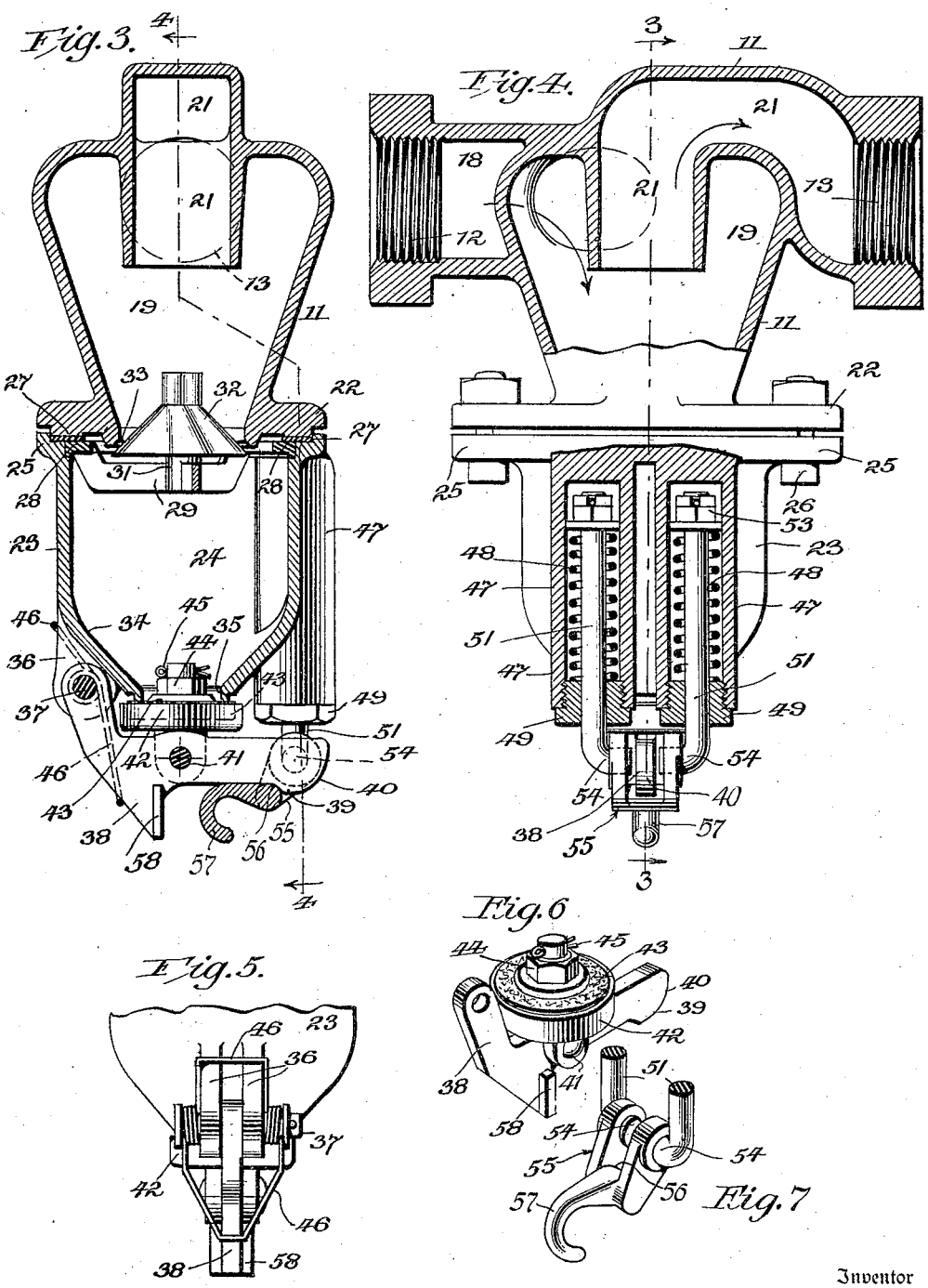

Patented Nov. 1, 1932

1,885,894

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

DRAIN CUP FOR AIR BRAKES

Application filed October 17, 1930. Serial No. 489,434.

This invention relates to air brakes, and particularly to means for discharging dirt and moisture from the piping system.

In the usual railway car brake equipment, there is a brake pipe extending the length of the car, and a branch pipe leading from the brake pipe to the triple valve, or some equivalent mechanism which controls the charging of the reservoirs, the admission of reservoir air to the brake cylinders, and the release of pressure from the brake cylinders.

In the present specification, the term "triple valve" will be used in a very broad sense to include any mechanism of this general character, whether it be strictly a conventional triple valve or not.

Each branch pipe is customarily provided with a stop cock, or the equivalent, for cutting out the brake equipment on that car in case of necessity. Interposed in the branch line there is also usually a dust collecting device, of some sort, and the usual practice is to interpose this between the stop cock and the triple valve. The particular form of the dust collector is not material. In the present application there is illustrated in somewhat modified form, a commercial type of vortex separator commonly used in the air brake art, to arrest dust and moisture droplets, and generally called a dust collector.

The present invention provides means for rapidly discharging the collected dust and moisture from the dust collector. It contemplates a quick opening valve which is so located as to insure the complete discharge of dirt and moisture from the dust collector.

The preferred embodiment of the invention is illustrated in the accompanying drawings, in which,—

Fig. 1 is a perspective view showing how the device is installed on the brake apparatus of a car.

Fig. 2 is a vertical axial section through the collecting chamber of a dust collector used in the air brake art, with the present invention applied. The full line position in Fig. 2 is the normal closed and locked position of the valve, while the dotted line position is that assumed by the parts after discharge has occurred and before the locking cam is actuated to force the valve into sealing engagement with its seat.

Fig. 3 is a view similar to Fig. 2, on a somewhat smaller scale, and showing the complete dust collector. The plane of section is indicated by the line 3—3 of Fig. 4.

Fig. 4 is a section on the line 4—4 of Fig. 3.

Fig. 5 is an elevation of the hinged end of the valve carrying lever showing the light spring which actuates the lever.

Fig. 6 is a perspective view of the valve and the lever which carries it.

Fig. 7 is a perspective view of the swinging cam and its support.

The body casting of the dust collector is indicated at 11 and has a threaded inlet connection 12 and a threaded discharge connection 13. The collector is interposed in a branch pipe 14 which leads from the brake pipe 15 to a triple valve or other device, indicated at 16. The form of the triple valve 16 is subject to the widest variation. The term "triple valve" is used to define a valve responsive to brake pipe pressure, and capable of controlling the operation of automatic air brakes.

A stop cock 17, of ordinary form, is interposed between the brake pipe 15 and the dust collector 11. Air entering through the connection 12 flows through a passage 18 and is directed tangentially into the vortex or centrifugal passage 19 in which the separation occurs. From this chamber the air passes off through the center exhaust passage 21 to the discharge connection 13, and thence to the triple valve (in charging flow).

The lower end of the body 11 is open and is provided with a bolting flange 22. A second casting 23, which forms the dust collecting chamber 24, is also provided with a flange 25. The flanges 22 and 25 are connected by the bolts 26. A tight joint between the body 11 and the body 23 is secured by means of a gasket 27. The body 23 is counterbored at its upper end to receive a ring 28 of a suitable form, with a plurality of radial arms 29, three of which are illustrated in the drawings. The arms 29 carry centrally thereof an upstanding stud 31. Upon this is vertically slidable a combined deflector and valve 32, which is also capable of limited tilting motion.

In the normal charged condition of the system, the member 32 is free to vibrate and this jars off any dust which settles upon it, causing the dust to flow into the chamber 24. In case of an emergency reduction of brake pipe pressure, the member 32 moves upward and seals approximately tightly against a seat 33. This precludes any violent reflux of air from the chamber 24, such as would tend to carry dust back into the branch pipe 14.

The body 23 tapers, as indicated at 34, to a central discharge port of suitable area at the extreme lower end of the chamber 24, and this discharge aperture is encircled by a valve seat or bead 35.

Pivoted to lugs 36 of the body 23 by means of a pin 37, is a lever 38 which underlies the valve seat 35 and which terminates at its free end on its lower side in a protruding boss 39 into which merges an inclined surface 40 at the extreme end of the lever. Pivoted at 41 to the lever 38 is a downwardly opening poppet valve 42. This is formed with a recess to receive a sealing or packing ring 43 which seats on the bead 35 when the valve is closed. The gasket 43 is held in place by a nut 44 and cotter pin 45. Coiled around the pivot pin 37 and engaging the lugs 36 and the lever 38 is a double coil spring 46. This is a relatively weak spring which is little more than sufficient to close the valve 42 against its seat, thus positioning the lever 38 favorably for locking engagement therewith of the cam mechanism now to be described.

Formed in the body 23 at the side opposite the lugs 36 are two parallel spring barrels 47 which house coiled compression springs 48. These springs are retained by threaded plugs 49 screwed into the lower ends of the barrels 47 and serving both as supports for the lower end of the springs 48, and as guides for the plunger rods 51. The rods 51 carry at their upper ends washers 52 and castellated nuts 53, the washers engaging the upper ends of the springs 48 so that the plunger rods 51 are drawn upward. The aggregate strength of the two springs 48, when applied to the lever 38, is somewhat more than sufficient to hold the gasket 43 of valve 42 seated against the bead 35, when chamber 24 is subject to maximum brake pipe pressure.

The lower ends of the plungers 51 are bent toward each other, as indicated at 54, and serve as a fulcrum for a bifurcated cam member, indicated generally by the numeral 55, and designed to straddle the end of lever 38. This cam member 55 has a convex cam surface 56 (see Fig. 2) which coacts with the inclined surface 40 and with the boss 39 at the end of the lever 38.

The cam 55 may be actuated by engaging the trigger 57 and shifting it about its fulcrum. This operation is ordinarily performed by means of a special hook furnished workmen for this purpose.

The parts are so dimensioned that when the cam 55 is in the full line position of Fig. 2, gasket 43 is compressed into sealing engagement with the bead 35. It will be observed that the plungers 51 are then drawn downward slightly, developing a definite yielding stress in the springs 48, and that the cam member 55 is retained in its locking position impositively because it has swung past the boss 39. When in this position it is protected from flying stones by the wings or lugs 58 formed on the lever 38 for this purpose. These wings may be variously formed to afford the desired degree of protection to the cam.

When the cam 55 is in the dotted line position of Fig. 2, lever 38 is free. The plungers 51 move upward to their limit of motion and the spring 46 alone holds the valve 42 and the gasket 43 in contact with the bead 35.

Assume that a train is made up and that the brake system is charged and ready for inspection. The inspector goes from car to car and on each car performs the following operation: He first closes the valve 17, then applies the hook behind the trigger 57 and jerks the cam 55 outward to free the lever 38. The pressure in the branch pipe beyond the cock 17 immediately blows the valve 42 wide open, against the feeble resistance of spring 46. The rapid motion of the valve frees this of dirt and the sudden out-blast of air sweeps all dirt and moisture from the chamber 24. The triple valve moves to emergency position, and if it be of the type equipped with an atmospheric emergency vent any moisture and dirt in the brake pipe adjacent the vent valve will be discharged at the same time. The opening of the valve 42 having vented pressure from the branch pipe 14 beyond cock 17, spring 46 almost immediately returns the valve 42 to its seated position, that is, the parts assume the dotted line position of Fig. 2. The inspector then engages the trigger 57 with his hook and pushes the cam 55 back to the full line position of Fig. 2. The cam 55, in moving to this position, rides over the inclined surface 40, compressing gasket 43 against bead 35 and finally snaps behind the boss 39 where it is impositively retained, as already described. The inspector then opens the cock 17 and proceeds to the next car, the entire operation having taken about ten seconds.

The device above described has the advantage that it discharges all moisture and dirt from the dust collector, causes the triple valve to function to produce an emergency application on the car, which last, in certain cases, frees the triple valve of dirt and moisture.

It is important to observe that the device functions to purge the dust collector by the expenditure of a relatively small volume of trapped compressed air. This result is secured by the use of a quick opening valve controlling an aperture of suitable size, directly above which aperture, the dirt tends to collect. Attempts to use small cocks and slow opening valves for this purpose have proved to be ineffectual. In such devices, since only a small volume of compressed air is available, a cock which opens progressively and relatively slowly, will allow the dissipation of pressure before the dirt is completely dislodged. The effect is to blow a small channel through a large body of collected dirt.

While the embodiment illustrated has demonstrated decided utility in practice, it is recognized that modified forms can be devised to accomplish the same result, and no necessary limitation to the particular structure is implied.

What is claimed is,—

1. In an air brake system, the combination of a brake pipe; a branch pipe leading therefrom; a stop cock in the branch pipe; a dust collector interposed in the branch pipe beyond said cock and having a dust collecting chamber formed with a discharge aperture at its lower portion; a triple valve connected to the branch pipe beyond said dust collector; and a quickly releasable outward opening valve controlling said discharge aperture.

2. In an air brake system, the combination of a brake pipe; a branch pipe leading therefrom; a stop cock in the branch pipe; a dust collector interposed in the branch pipe beyond said cock and having a dust collecting chamber formed with a discharge aperture at its lower portion; a triple valve connected to the branch pipe beyond said dust collector; a hinged valve adapted to seal said discharge aperture and to swing outward therefrom when released; and a manually operable locking device for said valve adapted alternatively to hold said valve in sealing engagement with said aperture or to release the same suddenly.

3. In a dust collector for use in pneumatic pressure lines operated at pressures higher than atmospheric, the combination of dust separating means; a dust collecting chamber into which said separating means discharges dust, said chamber being substantially free of internal obstructions, and having a dust discharge aperture of substantial size at its bottom; an outward opening valve for sealing said discharge opening; and quick releasable means for holding said valve closed.

4. The combination of a dust collector for use on pneumatic pressure lines operated at higher than atmospheric pressure and having a dust collecting chamber formed with a discharge aperture at its lower portion; an outwardly movable poppet valve for sealing said discharge aperture; a lever on which said valve is pivotally mounted, said lever being hingedly mounted; and cam means shiftable to engage said lever and force it in a valve closing direction.

5. The combination with the structure defined in claim 4, of a spring urging said lever in a valve closing direction, the strength of the spring being insufficient to resist the normal internal pressure in said dust collector but sufficient to seat the valve after such pressure has been dissipated.

6. The combination of a dust collector for use on pneumatic pressure lines operated at higher than atmospheric pressure, and having a dust collecting chamber formed with a discharge aperture in its lower portion; a hingedly mounted lever underlying said aperture, said lever being formed at its free end with a boss; an outwardly opening poppet valve pivotally mounted on said lever and adapted to close said discharge aperture; and a pivotally mounted cam member shiftable in reverse directions to release said lever, or to engage the same and by coaction with said boss force said valve into and retain it in sealing engagement.

7. The combination with the structure defined in claim 6, of a yielding support for said cam member, said yielding support being adapted to develop, under the specified camming action, sufficient closing force to resist the normal internal pressure in said dust collector.

8. The combination with a dust separating device of the type operated at pressures materially higher than atmospheric pressure, of a dust collecting chamber formed with a discharge aperture of substantial size, adjacent which the dust tends to collect; a hinged lever; an outwardly opening poppet valve shiftably mounted on said lever and carried thereby from a position in which it seals said aperture to a position in which it is substantially out of the path of material discharging through said aperture; a weak spring urging said lever in valve closing direction, said spring being insufficient to resist the normal pressure in said chamber acting on said valve; and yielding means for holding said lever in valve sealing position, said means including a pivoted cam, an inclined boss with which said cam coacts to force the valve closed and behind which it is impositively detained, and yielding means for developing valve sealing pressure by the coaction of said cam and said boss.

In testimony whereof I have signed my name to this specification.

CHARLES A. CAMPBELL.